United States Patent [19]
Yoshinaka

[11] Patent Number: 5,291,469
[45] Date of Patent: Mar. 1, 1994

[54] DIGITAL DATA RECORDING AND/OR REPRODUCING APPARATUS

[75] Inventor: Tadaaki Yoshinaka, Kanagawa, Japan

[73] Assignee: Sony Corporation, Tokyo, Japan

[21] Appl. No.: 780,802

[22] Filed: Oct. 22, 1991

[30] Foreign Application Priority Data

Oct. 23, 1990 [JP] Japan .................. 2-286258

[51] Int. Cl.⁵ .................. G11B 31/00; H04N 5/78
[52] U.S. Cl. .................. 369/69; 360/36.2; 358/310
[58] Field of Search .............. 369/69; 360/33.1, 36.1, 360/36.2; 358/310

[56] References Cited

U.S. PATENT DOCUMENTS

| | | |
|---|---|---|
| 4,206,476 | 6/1980 | Hashimoto . |
| 4,802,025 | 1/1989 | Shinada ............................ 360/36.2 |
| 4,805,035 | 2/1989 | Kawakami et al. ............... 358/310 |
| 4,823,207 | 4/1989 | Kobayashi et al. ............... 360/32 |
| 4,843,485 | 6/1989 | Reitmeier ......................... 360/33.1 |
| 5,067,031 | 11/1991 | Yamasaki et al. ............... 360/33.1 |

OTHER PUBLICATIONS

SMPTE Journal, vol. 98, No. 10, Oct. 1989, L. Thorpe, et al., "HDTV Digital VTR", pp. 738–747.

SMPTE Journal, vol. 89, No. 3, Mar. 1980, K. Yokohama, et al., "An Experimental Digital Videotape Recorder", pp. 173–180.

Television, vol. 19, No. 5, Sep. 1982, J. L. E. Baldwin, "Towards a single world format for digital television recording", pp. 27–31.

*Primary Examiner*—John Zazworsky
*Attorney, Agent, or Firm*—William S. Frommer; Alvin Sinderbrand

[57] ABSTRACT

In a digital data recording and/or reproducing apparatus, the frequency of digital data to be recorded or that has been reproduced is converted so that data blocks formed from the digital data have a time duration that allows for coordination with the timing of data sectors formed from the data blocks and recorded with predetermined timing in respective tracks on a recording medium.

6 Claims, 5 Drawing Sheets

DIGITAL DATA RECORDING AND/OR REPRODUCING APPARATUS

BACKGROUND OF THE INVENTION

The present invention relates to a recording and/or reproducing apparatus and is applicable to a digital video tape recorder for recording and/or reproducing, for example, a digital video signal on a magnetic tape.

A known type of recording and reproducing apparatus for recording and/or reproducing a video signal of a high definition television system is the so-called digital video tape recorder (DVTR) in which an input video signal is converted into a digital video signal and recorded on a magnetic tape.

In particular, as shown in FIG. 1, this known digital video tape recorder (DVTR) 1 includes a recording system 2 in which a component video signal S0 composed of red, green and blue signal S1, S2 and S3, or a component video signal S4 composed of a luminance signal S5 and R-Y and B-Y chrominance signals S6 and S7, having a bandwidth of, for example, 30 MHz, is supplied to a matrix circuit 3.

In the matrix circuit 3, if the component video signal S4 is the input signal, the luminance signal S5 and the R-Y and B-Y chrominance signals S6 and S7 included in the signal S4 are supplied to an analog to digital converter circuit 4. If the component video signal S0 is the input signal, it is converted into the component video signal S4 including the luminance signal S5 and the chrominance signals S6 and S7 and then supplied to the analog to digital converter circuit 4.

The analog to digital converter circuit 4 samples the luminance signal S5 in response to a first clock signal CK0 supplied thereto and a resulting digital luminance signal D1 having a bandwidth of 74.25 MHz is provided to a one-fourth times expansion circuit 5.

Further, the analog to digital converter circuit 4 samples the R-Y and B-Y chrominance signals S6 and S7 in response to the first clock signal CK0, the resulting R-Y and B-Y digital chrominance signals D2 and D3 each having a bandwidth of one half of 74.25 MHz are multiplexed in a multiplexer circuit 6 and the multiplexed signal is sent to the one-fourth times expansion circuit 5 as a multiplexed digital signal D4.

The one-fourth times expansion circuit 5 converts the digital luminance signal D1 and the multiplexed digital chrominance signal D4 provided to the expansion circuit 5 with a processing rate set by the first clock CK0 signal into a digital video data signal D5 composed of within each channel is a total of eight parallel data channels, four channels for each of the luminance signal and the multiplexed chrominance signal, with the signal in each channel having a processing rate set by a second clock signal CK1 whose frequency is one-fourth the frequency of the first clock signal CK0, so that the rate 18.5625 MHz. The resulting data D5 is sent to an interleave/parity adding circuit 7.

The interleave/parity adding circuit 7 interleave-processes the digital video data signal D5 and adds an outer parity code thereto and the resulting signal is supplied to a shuffling/parity adding circuit 8 as a digital video data signal D6.

The shuffling/parity adding circuit 8 shuffles the digital video data D6 and, after the latter is formed into blocks, adds an inner parity code thereto, and outputs the resulting signal to a SYNC-ID adding/coding circuit 9 as a digital video data signal D7.

The SYNC-ID adding/coding circuit 9 adds a synchronizing pattern and ID information including an identification code and an address to each block of the digital video data signal D7. The circuit 9 then divides the blocks of data into sets containing a predetermined number of blocks and adds a preamble to the end, and a postamble to the beginning of each set. The circuit 9 then codes the resulting signal with a 8—8 modulation system to produce a recording digital video data signal D8 which is sent to a parallel-serial converter circuit 10.

The parallel-serial converter circuit 10 converts the recording digital video data signal D8 into serial recording signals S10-S17 corresponding to eight channels and having a total data rate of 148.5 Mbps. The recording signals S10-S17 are supplied, respectively, to heads 13A-13H corresponding to the eight channels, the heads 13A-13H being mounted on a drum 12 around which a magnetic tape 11 is wound in the shape of an omega ($\Omega$).

In the recording system 2 of the DVTR 1, the first clock signal CK0 is generated by a clock generator circuit 15 and supplied to the analog to digital converter circuit 4, the one-fourth times expansion circuit 5 and the multiplexing circuit 6.

The second clock signal CK1 is obtained by dividing the first clock CK0 by four by means of a ¼ frequency divider circuit 16 and supplied to the one-fourth times expansion circuit 5, the interleave/parity adding circuit 8, the SYNC-ID adding/coding circuit 9 and the parallel-serial converter circuit 10 so that the recording signal processing circuits downstream from the one-fourth times expansion circuit 5 operate according to a timing provided by the second clock CK1.

Therefore, as shown in FIG. 2A, two sectors SEC1 and SEC2 corresponding to respective sectors are recorded in respective tracks on the magnetic tape 11 each of the heads 13A-13H over a period of two revolutions of the drum 12, which rotates at a rate of, 120 Hz so that one field of the input video signal S0 (or S4) is recorded during the period of two revolutions.

A preamble P1 and a postamble P2 are attached to each sector SEC to indicate a beginning and an end thereof and a data recording area including 640 data blocks B1-B640 is formed between the preamble P1 and the postamble P2.

Each data block B has a total length of 226 words as shown in FIG. 2B, and includes a synchronizing pattern SYNC of 2 words in length, the identification and address data ID/ADRS of 4 words in length, followed by 220 words of data DT.

On the other hand, in a reproducing system 20 of the DVTR 1, reproduced signals S20 to S27 corresponding respectively to eight channels and at data rate of 148.5 Mbps are provided from the heads 13A-13H mounted on the drum 12 and are converted by a serial to parallel converter 21 into parallel signals which are sent to a TBC/de-shuffling circuit 22 as a reproduced digital video data signal D10 at processing rate of frequency 18.5625 MHz set by the second clock signal CK1.

The TBC/deshuffling circuit 22 performs a time-axis correction for the reproduced digital video data signal D10 supplied thereto to match the clock phase with the second clock signal CK1 and then performs error correction on the basis of the inner parity code. The circuit 22 also performs de-shuffling processing and sends a resulting digital video data signal D11 to an error correction circuit 23.

The error correction circuit 23 performs error correction on the digital video data signal D11 based on the outer parity code and sends a resulting digital video data signal D12 to a de-interleave/error correction circuit 24.

The de-interleave/error correction circuit 24 de-interleaves the digital video data signal D12 and performs interpolation etc. to correct errors which could not be corrected by error correction based on the inner and outer parity codes and outputs a resulting digital video data signal D13 to a time compression video image synthesizer circuit 25.

The time compression video image synthesizer circuit 25 time-compresses the digital video data signal D13 for the eight channels which was provided as mentioned previously and synthesizes the signal to produce a digital luminance signal D14 and a multiplexed digital chrominance signal D15 having bandwidths of 74.25 MHz corresponding to the first clock signal CK0.

The digital luminance signal D14 is supplied directly to a digital to analog converter circuit 26. The multiplexed chrominance signal D15 is divided by a division circuit 27 into R-Y and B-Y digital chrominance signals D16 and D17 each having a bandwidth of one-half of 74.25 MHz and the resulting signals are supplied to the digital to analog converter circuit 26.

The digital to analog converter circuit 26 converts the digital luminance signal D14 and the R-Y and B-Y chrominance signals D16 and D17 into respective analog signals and outputs a luminance signal S30 having a bandwidth of 30 MHz and R-Y and B-Y chrominance signals S31 and S32 each having a bandwidth of 15 MHz to a matrix circuit 28.

In the reproduction system 20 of the DVTR 1, the second clock signal CK1 generated by the ¼ frequency divider circuit 16 is supplied to the serial to parallel converter circuit 21, the TBC/de-shuffling circuit 22, the error correction circuit 23, the de-interleave/error correction circuit 24 and the time compression video image synthesizer circuit 25 and the operations thereof are performed in response to the second clock signal CK1.

The first clock signal CK0 output from the clock generator circuit 15 is supplied to the time compression video image synthesizer circuit 25, the digital to analog converter circuit 26 and the divider circuit 27 so that those circuits operate in response to the first clock signal CK0.

The matrix circuit 27 is adapted to selectively output the luminance signal S30 and the R-Y and B-Y chrominance signals S31 and S32 directly as a component signal S33 or to produce red, green and blue signals S34, S35 and S36 from the inputted luminance signal S30 and the R-Y and B-Y chrominance signals S31 and S32 and to output the signals S34, S35 and S36 as a component video signals S37, thus reproducing the video signal recorded on the magnetic tape 11.

In the DVTR 1 as described above, the sampling frequency is selected as 4 fsc according to a quantization rule, etc., and, when the amount of data to be recorded is determined on this basis, the number of data block for one field of the video signal is not an integer.

For this reason, in the recording pattern discussed with respect to FIG. 2A, the interval between the block pulses which indicate a border between adjacent blocks B is discontinuous in each sector SEC, causing difficulties in signal processing in the recording system 2 and the reproducing system 20.

This problem becomes more severe with larger numbers of channels as in the above mentioned 8-channel recording and reproducing system.

More specifically, as shown in FIG. 3, for example, consider a DVTR in which four magnetic heads 32A–32D are arranged on a drum around which a magnetic tape 30 is wound in the shape of an omega ($\Omega$) at intervals of 90°. The magnetic heads 32A–32D rotate at a rate of 60 Hz, and video data corresponding to one field is converted into 4 parallel data channels and recorded as data sectors SD1, SD2, SD3 and SD4 (FIGS. 4B, 4D, 4F and 4H) each composed of a group of blocks, with respect to a vertical reference phase VR representing a border between adjacent fields as shown in FIG. 4A.

Since the number of blocks in each of the data sectors SD1, SD2, SD3, and SD4 in the respective channels within one field is not an integer, the respective block pulses BP1, BP2, BP3 and BP4 for the four channels have different phases as shown in FIGS. 4C, 4E, 4G and 4I. Consequently, circuits such as address circuits in the signal processing system and memories which process data block by block require four different respective circuit arrangements, causing the entire scale of the circuit to be large.

A similar problem occurs in the reproduction system. For example, when variable speed reproduction is to be performed, each of signals S20–S27 reproduced from the heads 13A–13H becomes a signal from another channel as shown in FIG. 6, since the respective heads 13A–13H (corresponding to the eight channels as mentioned previously with respect to FIG. 1) scan recording tracks T1, T2, T3, . . . , T8 on the magnetic tape 11 in an oblique manner as shown in FIG. 5.

Therefore, in this case, it is necessary to provide a channel converter circuit, for example, for exchanging the reproduced signals S20–S27 from the heads 13A–13H so as to provide normal outputs from the heads 13A–13H. Since there are phase difference between the block pulses BP1, BP2, BP3 and BP4 for the respective channels, even if the clock phases of the respective channels are matched with the first clock signal CK1 by means of the previously mentioned TBC/de-shuffling circuit 22, a correction circuit therefor is necessary, resulting in a complicated circuit design.

SUMMARY OF THE INVENTION

In view of the foregoing, an object of the present invention is to provide a digital recording and/or reproducing apparatus which solves simultaneously both of these problems with conventional systems, has a simple circuit design and is capable of recording and reproducing digital data as in the form of blocks for each predetermined unit of recording data.

The foregoing and other objects of the invention are achieved by the provision of a digital data recording and/or reproducing apparatus in which blocks are formed from digital data and are recorded on a predetermined recording medium and reproduced therefrom, and first frequency converter means is provided in a recording signal processing means for converting the processing rate of the data into a frequency at which an interval between borders separating adjacent data blocks is continuous in each data sector and the time intervals between block pulses BP thus become equal.

According to a second aspect of the invention, in a recording and/or reproducing apparatus in which blocks are formed from digital data and are recorded on a predetermined recording medium and reproduced therefrom, second frequency converter means is provided in a reproducing signals processing means for converting the processing rate of the reproduced data into a frequency at which an interval between borders separating adjacent data blocks is continuous in each of the data sectors.

The nature, principle and utility of the invention will become more apparent from the following detailed description when read in conjunction with the accompany drawings in which like parts are designated by like reference numerals or characters.

DETAILED DESCRIPTION OF THE INVENTION

Figure 1:
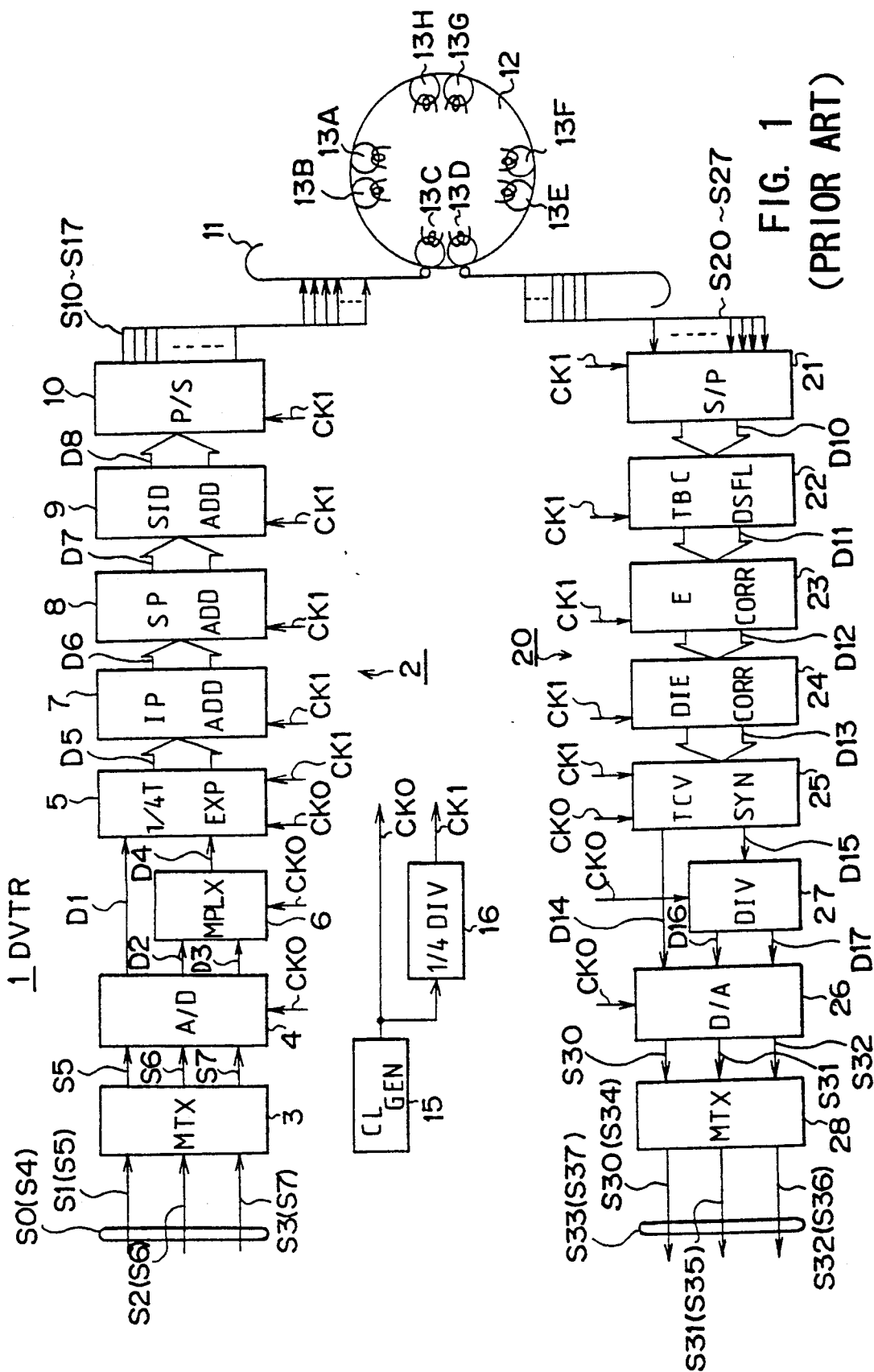
FIG. 1 is a block diagram showing a conventional digital video tap recorder.
Figure 7:
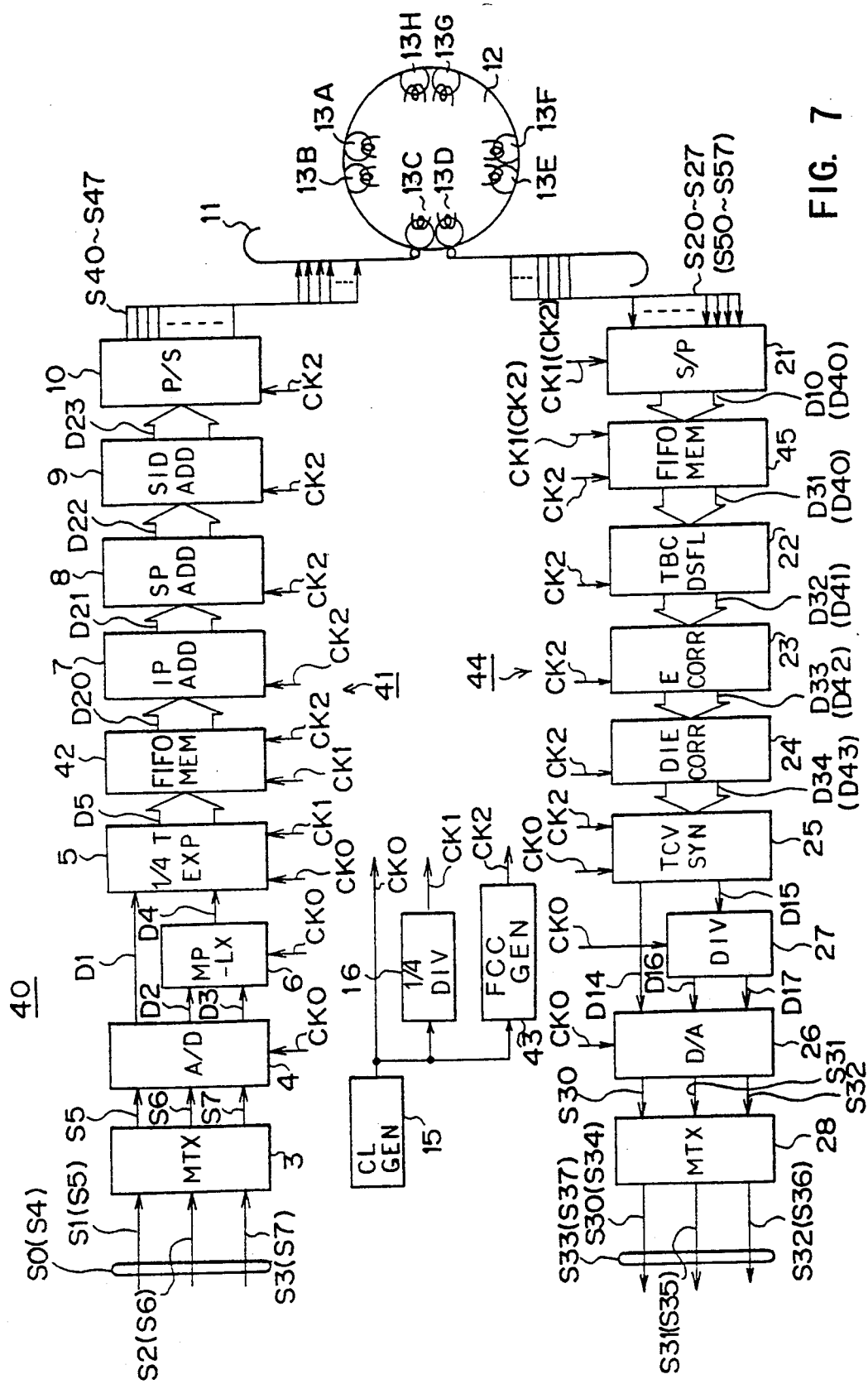
FIG. 7 is a block diagram showing an embodiment of a digital video tape recorder according to the invention.

Preferred embodiments of the present invention will be described with reference to the accompanying drawings:

In FIG. 7 (in which portions corresponding to those shown in FIG. 1 are assigned the same reference numerals), a reference numeral 40 indicates a digital video tape recorder (DVTR) according to the present invention. In the recording system 41 of the DVTR 40, a digital video data signal D5 output from a ¼ times expansion circuit 5 in response to a second clock signal CK1 is supplied to a frequency conversion memory 42.

The digital video data signal D5 represents eight parallel channels of data supplied at a processing rate of 18.5625 MHz.

The frequency conversion memory 42 is formed from a so-called asynchronous FIFO (first-in, first-out) memory and reads out the digital video data signal D5, which is written according to the second clock signal CK1, in accordance with a third clock signal CK2 to convert the frequency of the digital video data signal D5 to thereby produce a digital video data signal D20 having a processing rate corresponding to the third clock signal CK2. The digital video data signal D20 is output to an interleave/parity adding circuit 7.

Figure 2:
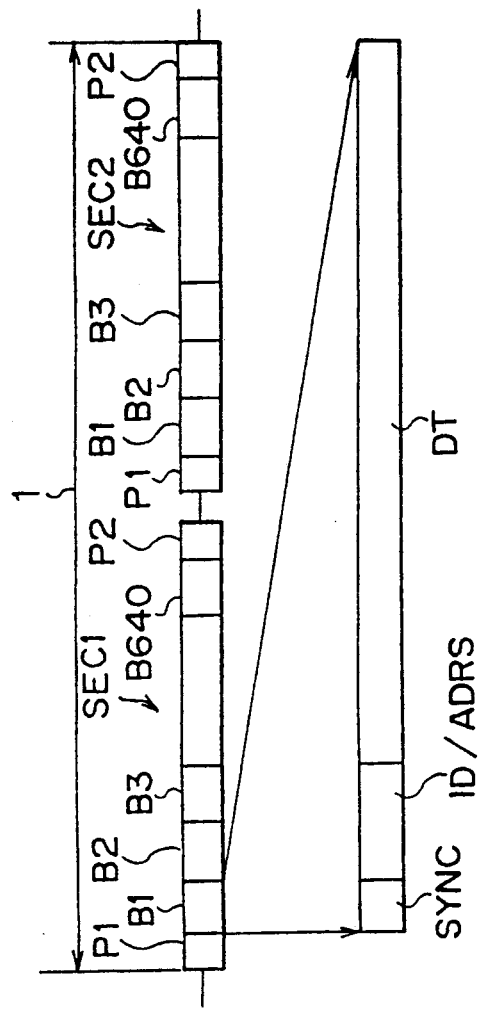
FIGS. 2A and 2B illustrate recording patterns for one field of video data.
Figure 3:
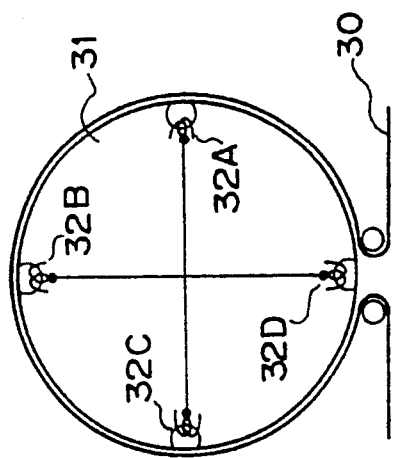
FIG. 3 illustrates the arrangement of a 4 channel recording head.
Figure 4:
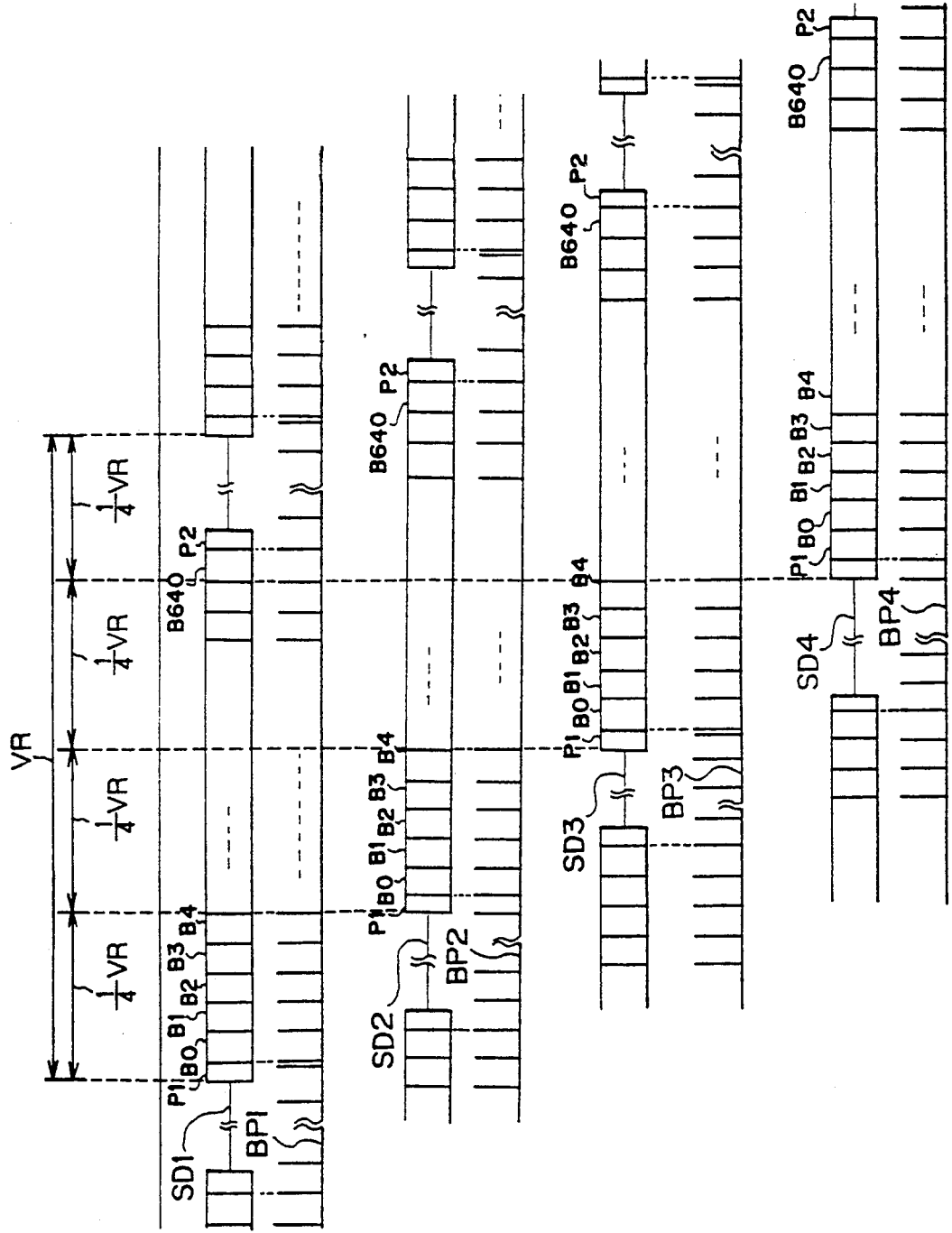
FIGS. 4A to 4I are timing charts for explaining the 4 channel recording operation.
Figure 5:
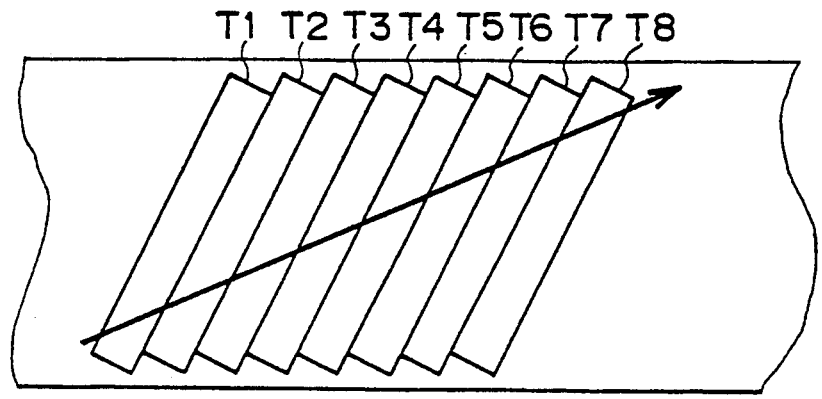
FIG. 5 is an illustration explaining variable rate reproduction.
Figure 6:
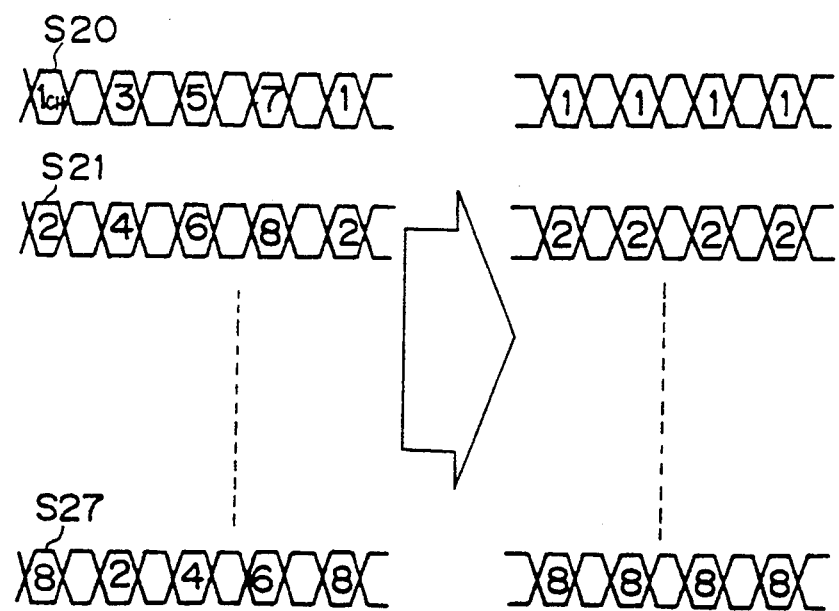
FIG. 6 is an illustration for explaining rearrangement of channel data.

The third clock signal CK2 is produced by a frequency conversion clock generator circuit 43 on the basis of a first clock signal CK0 output from a clock generator circuit 15 and its frequency is selected so that, as a practical matter, in a recording pattern like that mentioned with respect to FIG. 2A, the border between adjacent blocks B within each sector SEC (including a head blanking period) becomes continuous, and time intervals between block pulses are equal at the sector border.

The interleave/parity adding circuit 7, a shuffling-/parity adding circuit 8, a SYNC-ID adding/coding circuit 9 and a parallel to serial converter circuit 10 which make up the recording signal processing circuit downstream from the frequency conversion memory 42 are supplied with the third clock signal CK2 in lieu of the second clock signal CK1 so that these circuits operate in response to the third clock signal CK2.

The interleave/parity adding circuit 7 interleaves the digital video data D20, adds an outer parity code thereto and outputs the resulting signal to the shuffling-/parity adding circuit 8 as a digital video data signal D21.

The shuffling/parity adding circuit 8 shuffles the digital video data D21, forms data blocks and adds an inner parity code thereto and outputs the resulting signal to the SYNC-ID adding/coding circuit 9 as a digital data signal D22.

The SYNC-ID adding/coding circuit 9 adds to each block of the digital video data D22 a synchronizing pattern and ID information including an identification code and an address, etc., and, after a preamble and a postamble are added, respectively to a beginning and an end of each group of blocks consisting of a predetermined number of blocks, the video data D22 is coded with the 8—8 modulation system and supplied to the parallel to serial conversion circuit 10 as a recording digital video data signal D23.

The parallel to serial conversion circuit 10 converts the recording digital video data signal D23 into serial recording signals S40-S47 corresponding to eight channels, and which are supplied, respectively, to the heads 13A-13H corresponding to the eight channels, and which are mounted on the drum 12 around which the magnetic tape 11 is wound in the shape of an omega Ω.

Thus, in the DVTR 40 according to this embodiment, the input video signal S0 is recorded on the magnetic tape 11 with a recording pattern in which a border between adjacent blocks B is continuous within each sector SEC including the head blanking period and, therefore, there are common borders between adjacent blocks B among a plurality of the channels.

On the other hand, in a reproducing system 44 of the DVTR 40, when a signal is to be reproduced from a magnetic tape 11 having a recording pattern in which the border between adjacent blocks B in each sector SEC is discontinuous, the reproduced signals S20-S27 corresponding to eight channels having a total data rate of 148.5 [Mbps] are supplied from the respective magnetic heads 13A-13H to a serial to parallel conversion circuit 21.

In the serial to parallel conversion circuit 21, the reproduced signals S20-S27 for the eight channels are converted into parallel signals which are supplied to a frequency conversion memory 45 as a reproduced digital video data signal D10 with a frequency 18.5625 MHz corresponding to the second clock signal CK1.

The frequency conversion memory 45 is composed of an asynchronous FIFO memory like the above mentioned frequency conversion memory 42 and reads out the reproduced digital video data signal D10, which is written therein according to the second clock signal CK1, in accordance with a third clock signal CK2 to convert the frequency of the digital video data signal D10, to produce a digital video data signal D31 having a processing rate corresponding to the third clock signal CK2. The digital video data signal D31 is supplied to the TBC/reshuffling circuit 22.

The TBC/de-shuffling circuit 22, an error correction circuit 23, a de-interleave/error correction circuit 24 and a time compression video image synthesizing circuit 25 which make up the reproduction signal processing circuit downstream from the frequency conversion memory 45 are supplied with the third clock signal CK2 in lieu of the second clock signal CK1 so that these circuits operate in response to the third clock signal CK2.

The TBC/de-shuffling circuit 22 corrects the time axis of the reproduced digital video data D31 to match the clock phase with the third clock signal CK2, then performs error correction based on the inner parity code and de-shuffling and outputs a resulting digital video signal D32 to the error correction circuit 23.

The error correction circuit 23 corrects errors of the inputted digital video data D32 on the basis of the outer parity code and supplies a resulting digital video data signal D33 to the de-interleave/error correction circuit 24.

The de-interleave/error correction circuit 24 de-interleaves the digital video data signal D33, uses interpolation etc., to correct errors, which could not be corrected by error correction based on the inner and outer parity codes, and outputs the resulting digital video data signal D34 to the time compression image synthesizer circuit 25.

The time compression image synthesizer circuit 25 time-compresses and synthesizes the digital video data signal D34 for the eight channels received with timing controlled by the third clock signal CK2 and produces a digital luminance signal D14 and a multiplexed chrominance signal D15 each having a bandwidth of 74.25 [MHz] according to the first clocking signal CK0.

Further, in the reproducing system 44 of the DVTR 40, when the data to be reproduced from the magnetic tape has been recorded thereon by the recording system 40 with the recording pattern having continuous borders between adjacent blocks B in each sector SEC including the head blanking period, the reproduced signals S50–S57 for the eight channels obtained from the respective heads 13A–13H are supplied to the serial to parallel conversion circuit 21.

In the serial to parallel conversion circuit 21, the reproduced signals S50–S57 are converted into parallel data and supplied to the frequency conversion memory 45 as a reproduced digital video data signal D40 having processing rate corresponding to the third clock CK2.

In this case, the frequency conversion memory 45 reads out the digital video data D40, which is written therein in response to the third clock signal CK2 and sends a resultant reproduced digital video data D40 directly to the TBC/de-shuffling circuit 22, i.e., without frequency conversion.

In this case, the TBC/de-shuffling circuit 22, the error correction circuit 23, the de-interleave/error correction circuit 24 and the time compression image synthesizer circuit 25 which make up the reproduction signal processing circuit downstream from the frequency conversion memory 45 are supplied with the third clock signal CK2 and operate in response to the third clock signal CK2.

The TBC/de-shuffling circuit 22 corrects the time axis for the reproduced digital video data signal D40 to match the clock phase with the third clock signal CK2, performs error correction based on the inner parity code and de-shuffling and outputs a resulting digital video data signal D41 to the error correction circuit 23.

The error correction circuit 23 performs error correction of the digital video data signals D41 based on the outer parity code and supplies a resulting digital video signals D42 to the de-interleave/error correction circuit 24.

The de-interleave/error correction circuit 24 de-interleaves the digital video data signal D42, performs interpolation etc., to correct errors which could not be corrected by the error correction based on the inner and outer parity codes, and outputs a resulting digital video data D43 to the time compression image synthesizer circuit 25.

The time compression image synthesizer circuit 25 compresses time axis of the digital video data signal D43 for the eight channels received in response to the third clock signal CK2 and synthesizes the data to produce the digital luminance signal D14 and the multiplexed chrominance signal D15 each having a bandwidth of 74.25 MHz corresponding to the first clock signal CK0.

Thus, in the reproduction system 44 of the DVTR 40, when the data to be reproduced from the magnetic tape 11 has been recorded with a discontinuous border between adjacent blocks B in each sector SEC, it is possible to perform reproduction processing for the respective channels by the same reproduction signal processing circuit by frequency-converting the reproduced signal using the frequency conversion memory 45 so that the border between adjacent blocks B in each sector SEC is continuous.

Further, in the reproduction system 44 of the DVTR 40, when the data to be reproduced from the magnetic tape 11 has been recorded with the pattern having a continuous border between adjacent blocks B in each sector SEC including the head blanking period, it is possible to process the respective channels by the same reproduction signal processing circuit without performing frequency conversion by means of the frequency conversion memory by operating the reproduction signal processing system according to the third clock signal CK2.

According to the system as described above, in converting the video signal S0 into digital video data and recording the data in the form of data blocks in a plurality of channels on the magnetic tape 11, it is possible to realize a digital video tape recorder 40 capable of recording the video signal S0 as a recording pattern in which borders between blocks B in each sector SEC including the head blanking period are continuous.

Further, with the arrangement as described above, it is possible to realize a digital video tape recorder 40 which is capable of reproducing signals recorded in channels on the magnetic tape 11 with a recording pattern in which borders between blocks B are discontinuous while using the same reproduction signal processing circuit, by performing a frequency conversion in the frequency conversion memory 45 so that the borders between adjacent blocks B in each sector SEC become continuous.

Although, in the described embodiment, the frequency conversion memory 42 of the recording system 40 is inserted immediately downstream from the ¼ times expansion circuit 5, the frequency conversion memory 42 may alternatively be inserted into any other position in the recording signal processing circuit.

Further, although in the described embodiment, the frequency conversion memory 45 of the reproduction system 44 is inserted immediately downstream from the serial to parallel conversion circuit 21, the frequency conversion memory 45 may alternatively be inserted into any other position in the reproduction signal processing circuit.

Also, although, in the described embodiment, the present invention has been described as applied to a digital video tape recorder in which the input video signal is converted into digital data and recorded and reproduced through heads corresponding to eight channels, the number of recording and reproducing channels is not limited thereto and the present invention may be applied to recording and reproducing devices operating with more or fewer channels.

Moreover, although, in the described embodiment, the present invention has been described as applied to a digital video tape recorder, the present invention is not limited thereto and may be applied to a recording and reproducing apparatus such as an analog audio tape recorder, etc., in which the desired signal is recorded and reproduced after conversion into digital data.

As described above, according to the present invention, it is possible to realize a recording and reproducing apparatus capable of recording digital data with a recording pattern in which the border between recording units is continuous, by converting the processing rate of the digital data into a frequency at which the border between the recording units becomes continuous.

Further, by converting the processing rate of a reproduced signal into a frequency at which the border between recording units becomes continuous, it is possible to realize a recording and reproducing apparatus capable of easily reproducing a data from a recording medium having a recording pattern in which the border of the recording units is discontinuous.

While there have been described herein the preferred embodiments of the invention, it will be obvious to those skilled in the art that various changes and modifications may be made therein without departing from the invention, and it is intended therefore, to cover in the appended claims all such changes and modifications as fall within the true spirit and scope of the invention.

What is claimed is:

1. In a digital recording and reproducing apparatus including means for dividing input digital data signals into a plurality of channels so that the digital data signals within each of the channels have a first sampling frequency, means for shuffling said digital data signals, means for forming the shuffled digital data signals within each channel into data blocks which include a predetermined number of the digital data signals, means for forming said data blocks into data sectors composed of a predetermined number of said data blocks and including additional data, means for recording said data sectors in respective tracks on a recording medium by means of a plurality of heads each corresponding to a respective one of the channels, the data sectors corresponding to each channel being recorded at a predetermined timing, and the data blocks within the data sectors being recorded with block pulses for defining borders between adjacent data blocks and means for reproducing the recorded digital data signals from said recording medium, the improvement comprising:

frequency conversion means for converting said first sampling frequency of said digital data signals within said channels into a second sampling frequency before recording said digital data signals so that said block pulses have a timing in each of said channels that is continuous with said predetermined timing with which the data sectors in the respective channel are recorded.

2. A digital recording and reproducing apparatus according to claim 1, wherein said frequency conversion means comprises:

clock generator means for generating a first clock signal at said first sampling frequency and a second clock signal at said second sampling frequency; and memory means in which said digital data signals within said channels having said first sampling frequency are written in response to said first clock signal, and from which said digital data signals written therein are read out in response to said second clock signal.

3. A digital recording and reproducing system according to claim 2, wherein said memory means is a first-in, first-out memory.

4. A digital reproducing apparatus including means for reproducing digital data signals in a plurality of channels from a recording medium on which said digital data signals were recorded in the form of data sectors each recorded in a respective track corresponding to one of said channels, each of said data sectors being composed of a plurality of data blocks and additional data added to said plurality of data blocks each of said data blocks including a predetermined number of said digital data signals and having a block pulse for defining a border between the respective data block and an adjacent data block, the data sectors corresponding to each of said channels being reproduced with a predetermined timing, said digital data signals within said channels being reproduced at a first sampling frequency such that the block pulses of said data blocks of reproduced digital data signals in at least some of the channels have a timing that is not continuous with said predetermined timing with which the data sectors in the respective channel are reproduced, the apparatus comprising:

frequency conversion means for converting said first sampling frequency of said reproduced digital data signals within said channels into a second sampling frequency different from said first sampling frequency and such that said block pulses have a timing in each of said channels that is continuous with said predetermined timing with which the data sectors in the respective channel are reproduced; and time axis compression means for compressing a time axis of said reproduced digital data signals having said second sampling frequency so that said second sampling frequency is converted into a third sampling frequency that is different from said second sampling frequency.

5. A digital reproducing apparatus according to claim 4, wherein said frequency conversion means comprises:

clock signal generation means for generating a first clock signal at said first sampling frequency, generating a second clock signal at said second sampling frequency, and generating a third clock signal at said third sampling frequency; and memory means in which said reproduced digital data signals within said channels having said first sampling frequency are written in response to said first clock signal, and from which said digital data signals written therein are read out in response to said second clock signal, wherein said third clock signal is supplied to said time axis compression means for use in converting said second sampling frequency into said third sampling frequency.

6. A digital reproducing apparatus according to claim 5, wherein said memory means is a first-in, first-out memory.

* * * * *